(12) United States Patent
Jarzombek et al.

(10) Patent No.: US 8,887,496 B2
(45) Date of Patent: Nov. 18, 2014

(54) HEAT RECOVERY SYSTEM FOR A VEHICLE

(75) Inventors: Joyce Ann Jarzombek, Harrison Township, MI (US); James M. Emery, Saline, MI (US); Philip Damian Cierpial, Grosse Pointe Park, MI (US); Ray Host, Mt. Clemens, MI (US); Eric Garner Ladner, Canton, MI (US); Robert Andrew Wade, Dearborn, MI (US); Emad Khalil, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 13/358,370

(22) Filed: Jan. 25, 2012

(65) Prior Publication Data

US 2013/0186061 A1 Jul. 25, 2013

(51) Int. Cl.
*F01N 3/02* (2006.01)
(52) U.S. Cl.
USPC .............. 60/320; 60/274; 60/298; 60/323
(58) Field of Classification Search
USPC .............. 60/274, 298, 320, 321, 323
See application file for complete search history.

(56) References Cited

U.S. PATENT DOCUMENTS

| | | | | |
|---|---|---|---|---|
| 3,444,687 A * | 5/1969 | Andersson | | 60/305 |
| 4,187,678 A * | 2/1980 | Herenius | | 60/321 |
| 5,109,668 A * | 5/1992 | Lindstedt | | 60/310 |
| 5,148,675 A * | 9/1992 | Inman | | 60/321 |
| 6,397,589 B1 * | 6/2002 | Beson et al. | | 60/320 |
| 7,287,373 B2 * | 10/2007 | Matsuda | | 60/321 |
| 7,628,663 B2 * | 12/2009 | McKinney | | 440/89 C |
| 7,699,675 B1 * | 4/2010 | Powers et al. | | 440/88 J |
| 2008/0308050 A1 | 12/2008 | Kuhlbach et al. | | |
| 2009/0241526 A1 | 10/2009 | Son et al. | | |
| 2011/0239634 A1 | 10/2011 | Reynolds | | |

FOREIGN PATENT DOCUMENTS

GB 2428739 A 2/2007

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

A heat recovery system for an engine is provided herein. According to one approach, the heat recovery system includes an upstream portion that circumferentially wraps around an outlet of an exhaust manifold. Further, the heat recovery system includes a downstream portion in direct surface contact with a top exterior surface and a bottom exterior surface of a plurality of runners of the exhaust manifold.

20 Claims, 7 Drawing Sheets

HEAT RECOVERY SYSTEM FOR A VEHICLE

BACKGROUND AND SUMMARY

Hybrid vehicles, such as plug-in hybrid vehicles, may have two modes of operation: an engine-off mode and an engine-on mode. While in the engine-off mode, power to operate the vehicle may be supplied by stored electrical energy. While in the engine-on mode, the vehicle may operate using engine power. By switching between electrical and engine power sources, engine operation times may be reduced, thereby reducing overall carbon emissions from the vehicle. However, shorter engine operation times may lead to insufficient engine coolant temperature maintenance.

Various strategies have been developed to address coolant temperature management in hybrid vehicle systems. As one example, waste exhaust heat may be recovered to more rapidly increase engine coolant temperature. For example, during cold start engine idle conditions, various systems may utilize waste engine heat to hasten engine warm-up, thereby enabling improved emission performance, engine efficiency, etc. Likewise, waste heat in the engine cooling system and/or lubricating system may be directed to the cabin for cabin heating or to the lubricating system, thereby reducing lubricant viscosity thus reducing friction.

For example, US 2011/0239634 describes a heat exchanger recovery unit that allows for exhaust heat to be recovered from an exhaust system. The system includes a first and second flow passages that each recovery heat from different areas of the exhaust system. Further, the first and second flow passages each include a control valve to selectively communicate the first and/or second flow passage with their respective component of the exhaust system. Through actuation of the control valves, the heat exchanger recovery unit can maintain coolant temperature.

The inventors herein have recognized various issues with the above system. In particular, closing a valve results in stagnant coolant, which also isolates coolant from recovering heat from the exhaust system and thus transferring the recovered heat to engine components that need warming is inhibited.

As such, one example approach to address the above issues is to utilize an exhaust manifold that includes an integrated coolant passage that passively enables coolant flow while a vehicle is in operation. Such an approach allows coolant to continuously circulate through the coolant passage to increase a heat exchange rate while balancing a contact area between the coolant passage and the exhaust manifold. The coolant passage may be in direct surface contact with an exterior surface of an exhaust manifold to recover heat through conduction. The coolant passage is arranged such that an upstream portion of the coolant passage wraps around an outlet of the exhaust manifold. This arrangement allows for an increased heat exchange rate. Further, the coolant passage includes a downstream portion that closely matches a contour of a top surface and a bottom surface of a plurality of runners of the exhaust manifold. In this way, the coolant passage contacts the exhaust manifold to recover exhaust heat from the exhaust manifold via conduction more efficiently that previous approaches due to the resulting compact geometric configuration.

Note that various coolant passages may be included. Further, the coolant passages may be fluidically coupled such that coolant flow may cycle through the heat recovery system. Further still, the exhaust manifold assembly may include various apertures to reduce contact area between the heat recovery system and the exhaust manifold, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-3B are drawn approximately to scale.

DETAILED DESCRIPTION

The following description relates to an exhaust manifold that includes an integrated coolant passage in direct surface contact with an exterior surface of an exhaust manifold and in direct surface contact with interior exhaust gas passages. The coolant passage is arranged such that an upstream portion of the coolant passage wraps around an outlet of the exhaust manifold. This arrangement allows for an increased heat exchange rate. Further, the coolant passage includes a downstream portion that closely matches a contour of a top surface and a bottom surface of a plurality of internal runners of the exhaust manifold. This system allows for a more compact design with a lower weight than traditional designs due to the resulting geometric configuration. Various coolant return passages may be included in the disclosed system. For example, one or more return passages may enable coolant to cycle through the downstream portion. Further, the integrated heat recovery system in the exhaust manifold may utilize an aperture in different ways; for example, by reducing contact area between the coolant passage and the exhaust manifold, and by reducing manifold slip during manufacturing.

Figure 1A:
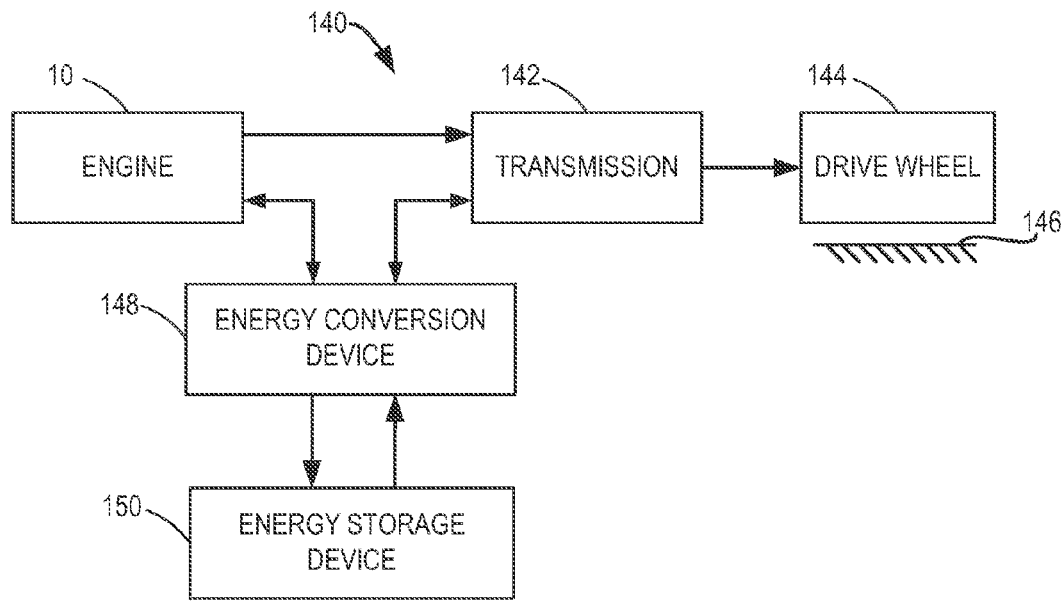
FIG. 1A schematically shows a hybrid propulsion system.

Referring to FIG. 1A, the figure schematically depicts a vehicle with a hybrid propulsion system 140. Hybrid propulsion system 140 includes an internal combustion engine 10, further described herein with particular reference to FIG. 1B, coupled to transmission 142. Transmission 142 may be a manual transmission, automatic transmission, or combinations thereof. Further, various additional components may be included, such as a torque converter, and/or other gears such as a final drive unit, etc. Transmission 142 is shown coupled to drive wheel 144, which in turn is in contact with road surface 146.

In this example embodiment, the hybrid propulsion system 140 also includes an energy conversion device 148, which may include a motor, a generator, among others and combinations thereof. The energy conversion device 148 is further shown coupled to an energy storage device 150, which may include a battery, a capacitor, a flywheel, a pressure vessel, etc. The energy conversion device 148 can be operated to absorb energy from vehicle motion and/or the engine and convert the absorbed energy to an energy form suitable for storage by the energy storage device (i.e., provide a generator operation). The energy conversion device can also be operated to supply an output (power, work, torque, speed, etc.) to the drive wheels 144 and/or engine 10 (i.e., provide a motor operation). It should be appreciated that the energy conversion device 148 may, in some embodiments, include only a motor, only a generator, or both a motor and generator, among various other components used for providing the appropriate conversion of energy between the energy storage device 150 and the vehicle drive wheels 144 and/or engine 10.

The depicted connections between engine 10, energy conversion device 148, transmission 142, and drive wheel 144 indicate transmission of mechanical energy from one component to another, whereas the connections between the energy conversion device 148 and the energy storage device 150 may indicate transmission of a variety of energy forms such as electrical, mechanical, etc. For example, torque may be transmitted from engine 10 to drive the vehicle drive wheels 144 via transmission 142. As described above energy storage device 150 may be configured to operate in a generator mode and/or a motor mode. In a generator mode, energy conversion device 148 absorbs some or all of the output from engine 10 and/or transmission 142, which reduces the amount of drive output delivered to the drive wheel 144, or the amount of braking torque to the drive wheel 144. Such operation may be employed, for example, to achieve efficiency gains through regenerative braking, improved engine efficiency, etc. Further, the output received by the energy conversion device may be used to charge energy storage device 150. In another example, the energy conversion device may supply mechanical output to engine 10 and/or transmission 142, for example by using electrical energy stored in an electric battery.

Hybrid propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 1A may be controlled by a vehicle controller as will be described below with reference to FIG. 1B.

From the above, it should be understood that the exemplary hybrid propulsion system is capable of various modes of operation. In a full hybrid implementation, for example, the propulsion system may operate using energy conversion device 148 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 144. In still another mode, which may be referred to as an "assist" mode, the energy conversion device 148 or an alternate torque source may supplement and act in cooperation with the torque provided by engine 10. As indicated above, energy conversion device 148 may also operate in a generator mode, in which torque is absorbed from engine 10 and/or transmission 142. Furthermore, energy conversion device 148 may act to deliver torque to the engine or absorb torque from the engine during idle speed control of engine 10.

Figure 1B:
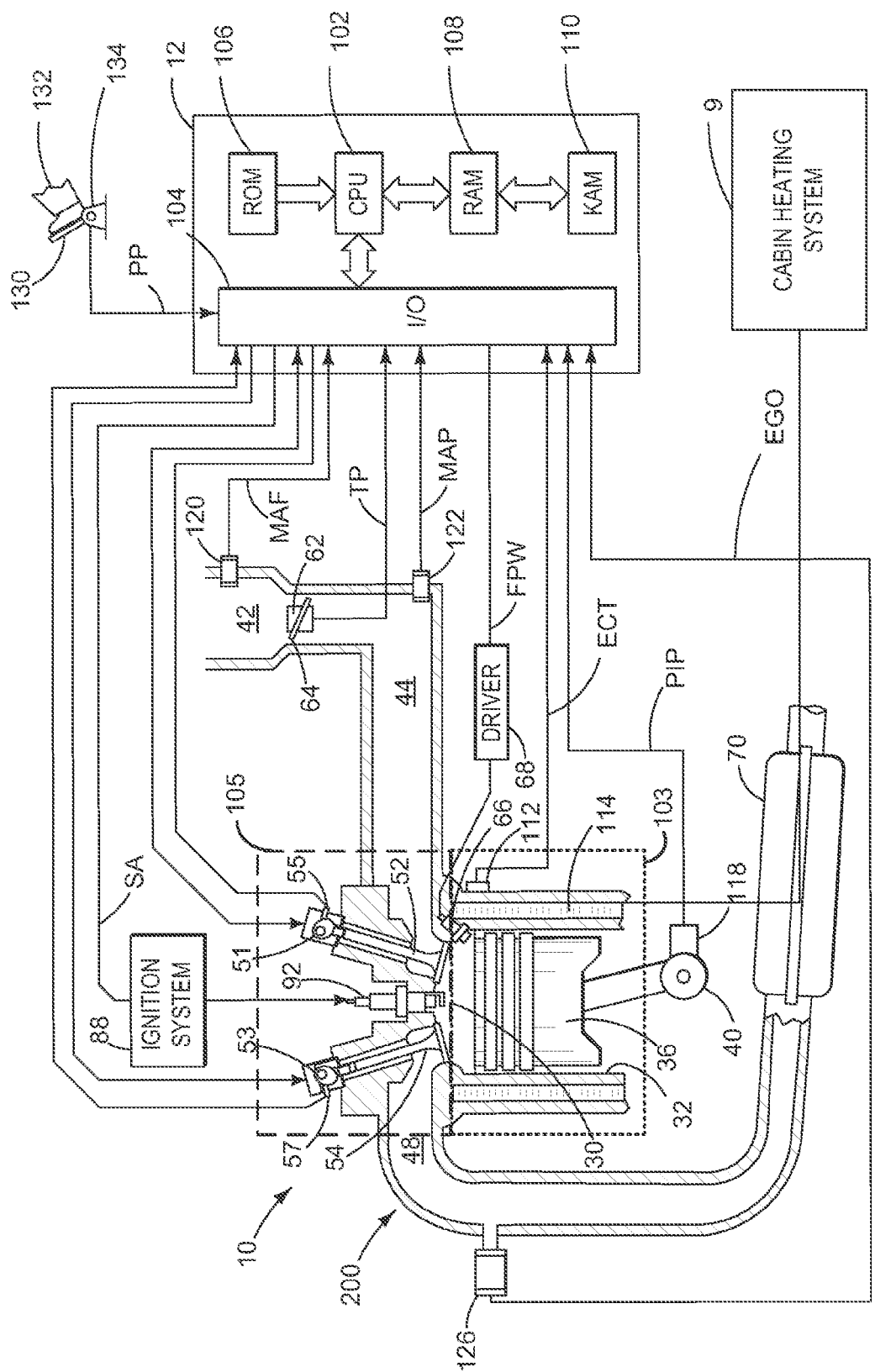
FIG. 1B schematically shows an example engine including an exhaust manifold assembly according to an embodiment of the present disclosure.

FIG. 1B is a schematic diagram showing one cylinder of multi-cylinder engine 10, which may be included in a propulsion system of a vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Engine 10 shows an example combustion cylinder 30 including an engine block region 103 and a cylinder head region 105. Engine block region 103 may include combustion cylinder walls 32 as described further below. Cylinder head region 105 may include one or more values for selectively communicating with an intake and an exhaust system, for example. Further, cylinder head region 105 may include a fuel injector, and a spark plug, for example. When installed, cylinder head region 105 may be fastened to engine block region 103 with a gasket assembly positioned between in order to form a tight seal between the cylinder head and the engine block, for example.

Combustion chamber (cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. Further, portions of exhaust passage 48 may comprise an exhaust manifold assembly 200. For example, a portion immediately downstream from exhaust valve 54 may be defined as an exhaust manifold. As described in more detail below, the exhaust manifold assembly may include an integrated heat recovery system. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted on the side of the combustion chamber or in the top of the combustion chamber, for example. Fuel may be delivered to fuel injector 66 by a fuel delivery system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Sensor 126 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The exhaust system may include light-off catalysts and underbody catalysts, as well as exhaust manifold, upstream and/or downstream air-fuel ratio sensors. Converter 70 can include multiple catalyst bricks, in one example. In another example, multiple emission control devices, each with multiple bricks, can be used. Converter 70 can be a three-way type catalyst in one example.

Controller 12 is shown in FIG. 1B as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof. The engine cooling sleeve 114 is coupled to the cabin heating system 9.

Further, cabin heating system may be coupled to an engine coolant system (not shown). It will be appreciated that the engine coolant system may include a pump to pump coolant through various coolant passages. The pump may be driven by an engine drive system, for example. In some embodiments, the engine coolant system may include an electric pump to pump coolant when the engine is not in operation, for example, during engine-off mode when the vehicle is powered by stored electrical energy. Further, the engine coolant system may include a heat recovery system 202 to warm engine coolant by recovering heat from an exhaust manifold, as described in more detail below. Further, it will be appreciated the engine coolant system and/or the heat recovery system may communicate with a radiator (not shown) to maintain coolant temperature. In some embodiments, an electric radiator fan may be included to maintain coolant temperature during engine-off mode.

As described above, FIG. 1B shows only one cylinder of a multi-cylinder engine, and each cylinder may similarly include its own set of intake/exhaust valves, fuel injector, spark plug, etc.

Figure 2A:
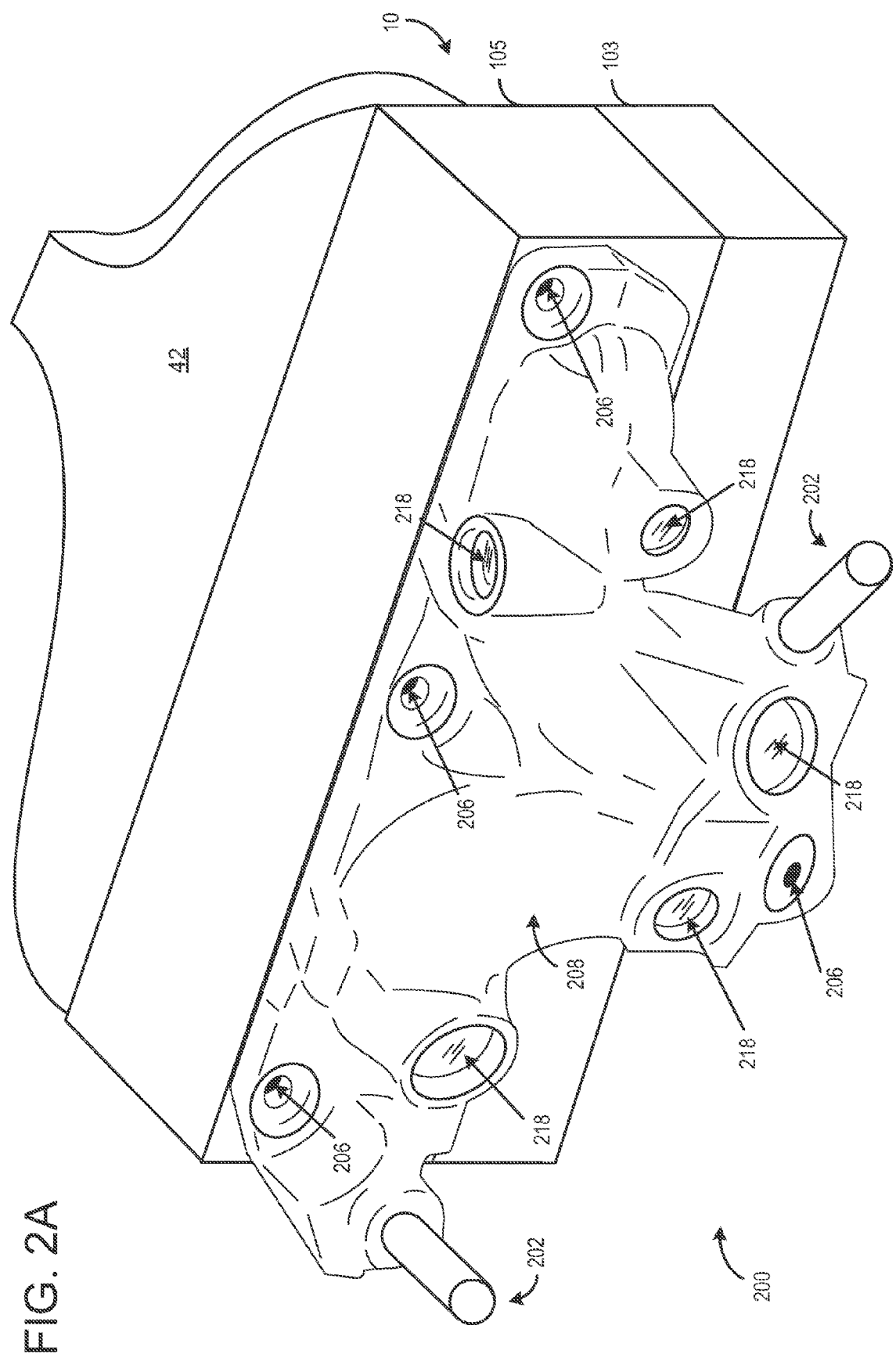
FIG. 2A schematically shows an example exhaust manifold assembly that may be included in the example engine of FIG. 1B.
Figure 2B:
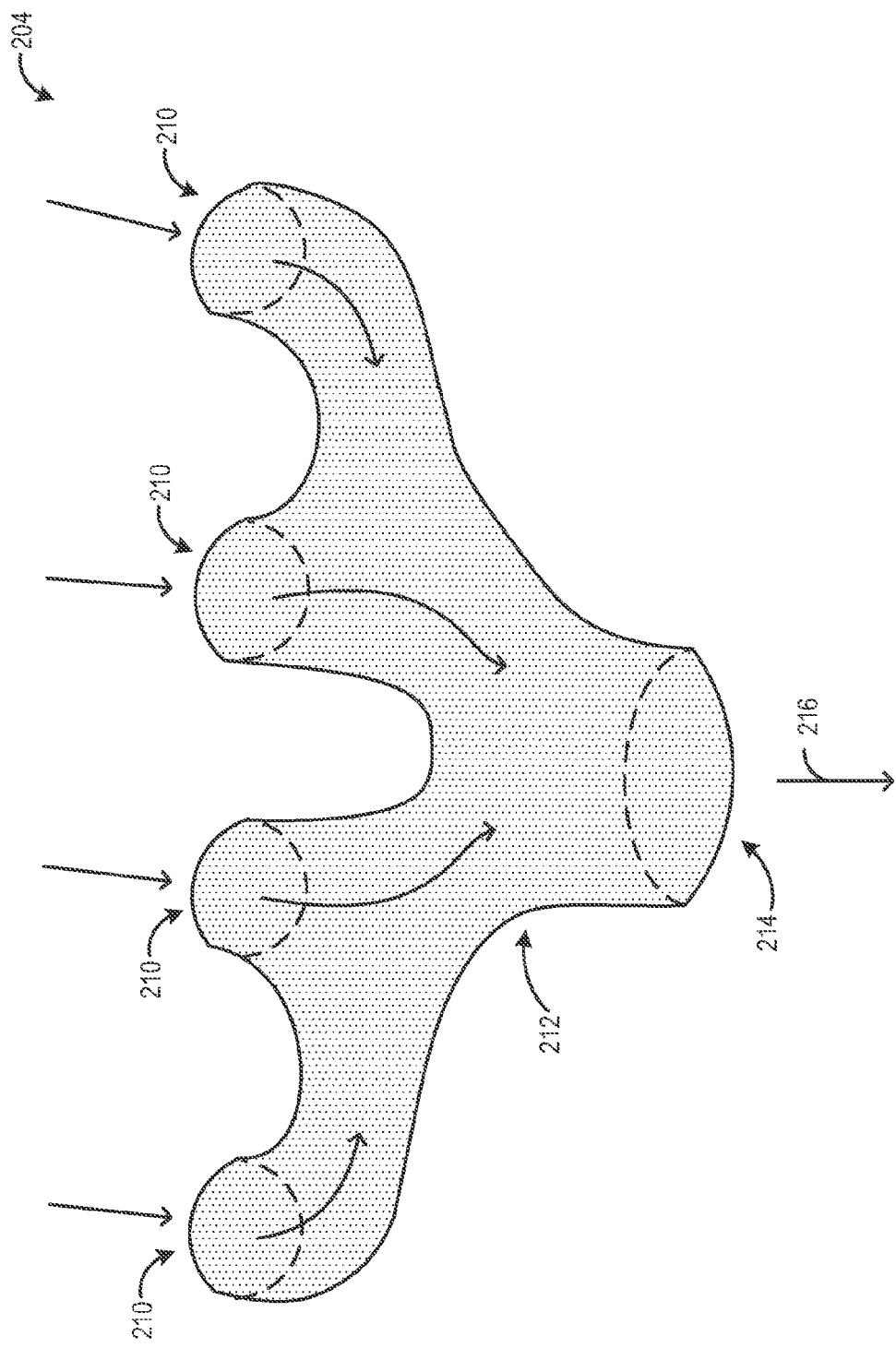
FIG. 2B schematically shows an example exhaust manifold that may be included in the exhaust manifold assembly of FIG. 2A.

FIG. 2A shows an exhaust manifold assembly 200 and FIG. 2B shows an exhaust manifold 204 that may be included in exhaust manifold assembly 200 according to an embodiment of the present disclosure. Referring to FIG. 2A, manifold assembly 200 is coupled to engine 10 at cylinder block 103 and/or cylinder head 105, as shown. It will be appreciated that manifold assembly 200 is removably connected to cylinder block 103 and/or cylinder heat 105. As such, manifold assembly 200 includes a plurality of apertures 206 for fastening the manifold assembly to the engine, for example. The plurality of apertures may align with corresponding apertures associated with engine block 103 and/or cylinder head 105. It is to be understood that the plurality of apertures 206 may be configured to receive a suitable fastening member such as a screw, a bolt, or another fastener to couple the exhaust manifold assembly to engine 10. For example, in some embodiments the plurality of apertures may be threaded. However, the plurality of apertures may not be threaded, if desired.

The manifold assembly may include an outer shell 208, an exhaust manifold 204, and a heat recovery system 202. It will be appreciated that the perspective view of FIG. 2A does not show exhaust manifold 204. Outer shell 208 may enclose exhaust manifold 204 and heat recovery system 202. In other words, exhaust manifold 204 and heat recovery system 202 are positioned within an interior cavity of outer shell 208.

Manifold assembly 200 may be configured to receive exhaust gases that result from the combustion of an air-fuel mixture. As best shown in FIG. 2B, exhaust manifold 204 may include a plurality of manifold runners 210. Each manifold runner may selectively communicate with a corresponding combustion cylinder via an exhaust valve, as described above. The plurality of manifold runners may converge at a converging portion 212. Further, the exhaust gases may flow out of exhaust manifold 204 at manifold outlet 214 to a downstream exhaust passage, for example. An exhaust gas flow direction out of exhaust manifold 204 is indicated generally by arrow 216. As described herein, the plurality of manifold runners, the converging portion, and/or the manifold outlet may be referred to as a manifold exhaust passage.

In the illustrative embodiment, exhaust manifold 204 includes four manifold runners 210, and thus, may be configured for a four cylinder engine. It will be appreciated that exhaust manifold 204 may include a suitable number of manifold runners. Further, engine 10 may include more than one cylinder bank, and therefore, may include more than one exhaust manifold configured to receive exhaust gases from each cylinder bank. In some embodiments, two exhaust manifolds may converge prior to channeling exhaust gases to a downstream exhaust passage, such as a V-6 or a V-8 engine configuration.

Referring back to FIG. 2A, manifold assembly 200 includes a plurality of casting depressions 218, as shown. The plurality of casting depressions 218 may reduce exhaust manifold shift during manufacturing. In other words, the casting depressions may help align the exhaust manifold with the integrated heat recovery system. Further, the plurality of casting depressions may provide the potential advantage of balancing surface contact between the exhaust manifold and the heat recovery system, as described in more detail below. As shown, each casting depression may be generally circular in shape; however, other geometric shapes are possible without departing from the scope of this disclosure. Further, it will be appreciated that the casting depressions may be various sizes. Further still, the casting depressions may be arranged in various orientations and therefore may be associated with various different surfaces of the exhaust manifold assembly.

Figure 3A:
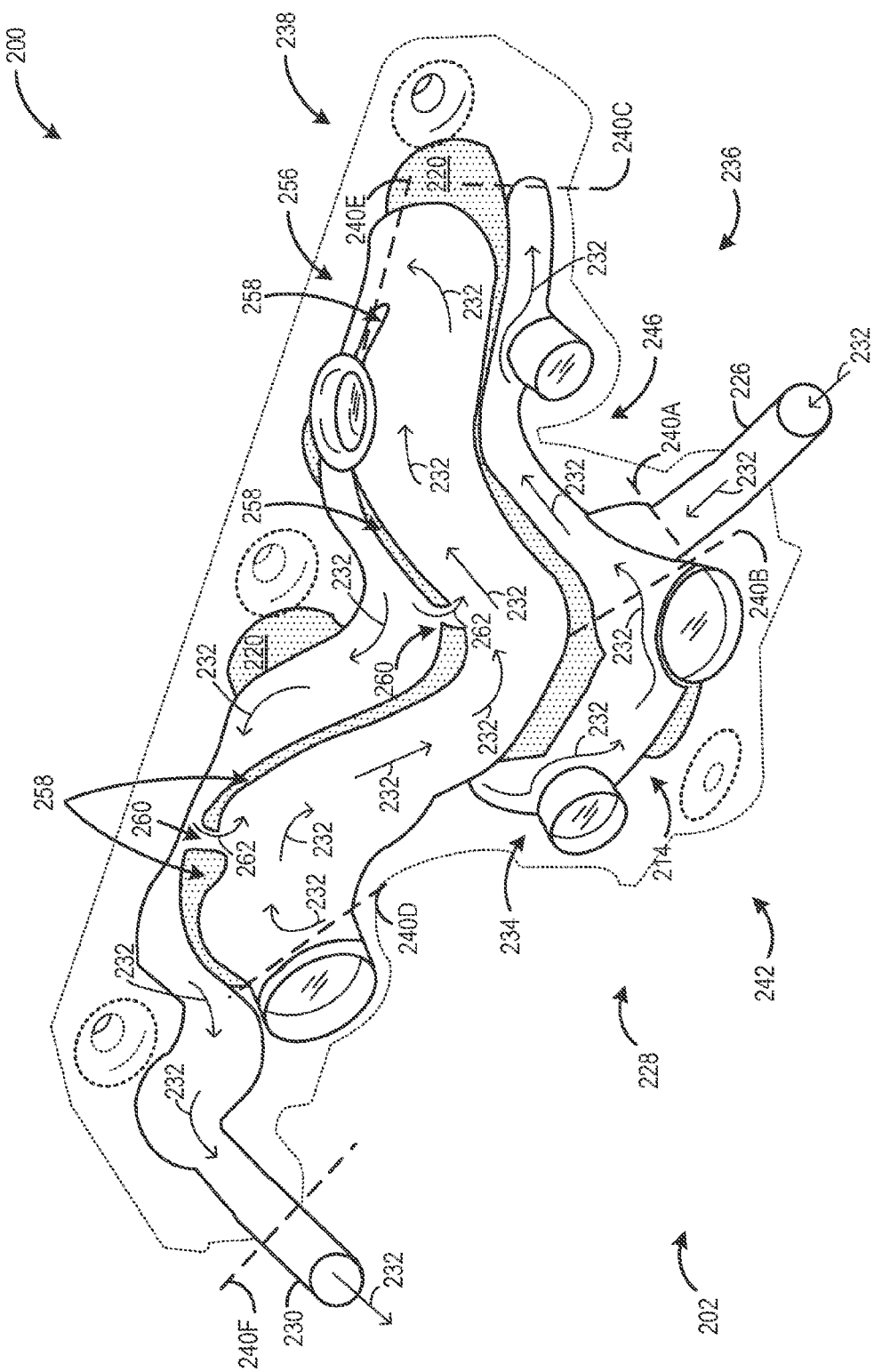
FIG. 3A schematically shows a top perspective view of the exhaust manifold assembly of FIG. 2A.
Figure 3B:
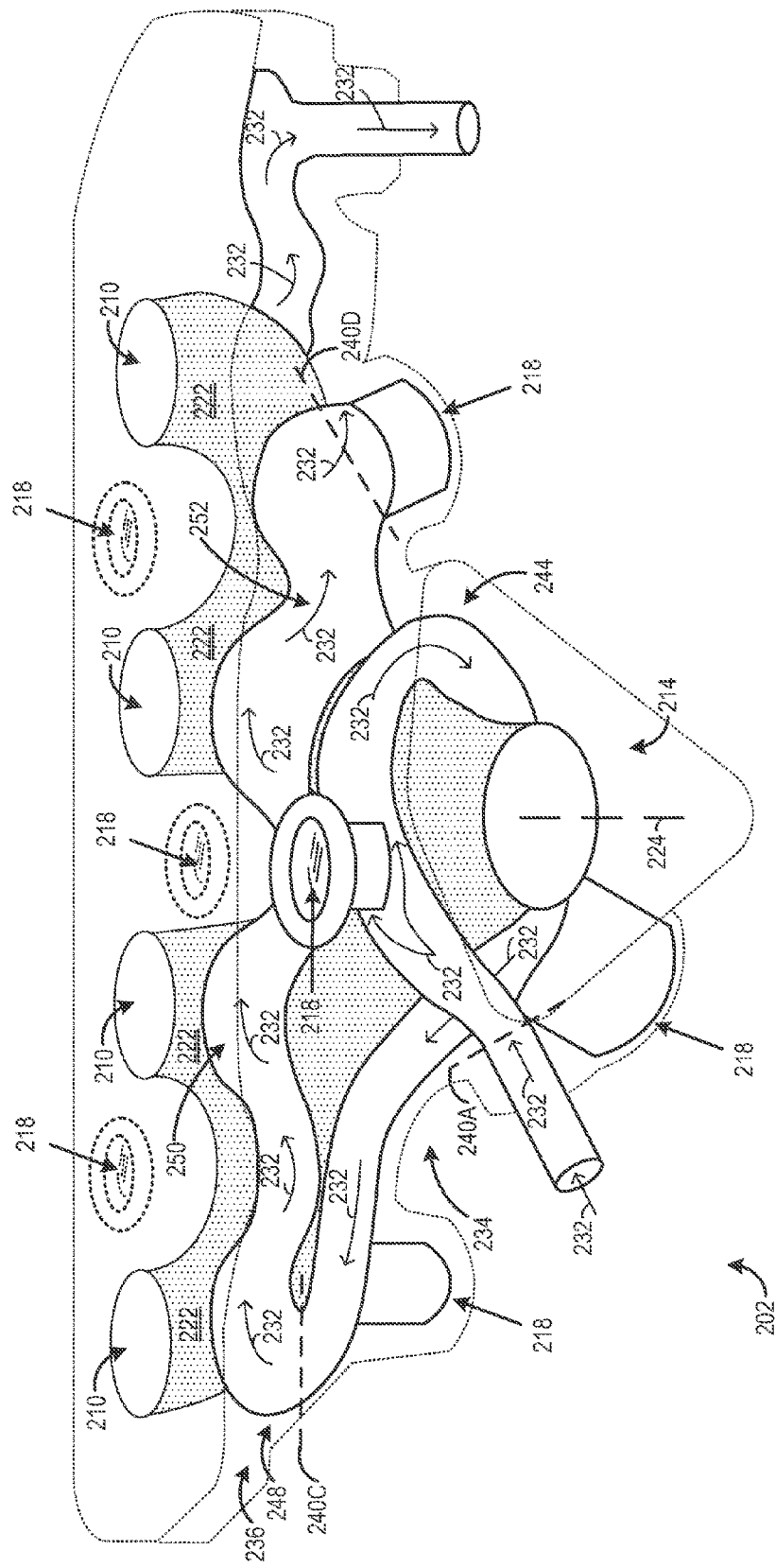
FIG. 3B schematically shows a bottom perspective view of the exhaust manifold assembly of FIG. 2A.

FIG. 3A schematically shows a top perspective view of exhaust manifold assembly 200 with the outer shell removed, thus revealing exhaust manifold 204 and heat recovery system 202. As referred to herein, the top perspective view of exhaust manifold assembly 200 may refer to a perspective as viewed from a top surface 220 of the plurality of manifold runners 210. Therefore, the top perspective view may also coincide with a top surface of the cylinder head, when assembly 200 is attached to engine 10, for example. FIG. 3B schematically shows a bottom perspective view of exhaust manifold assembly 200 with the outer shell removed. As referred to herein, the bottom perspective view of exhaust manifold assembly 200 may refer to a perspective as viewed from a bottom surface 222 of the plurality of manifold runners 210. As shown, the bottom perspective view may include a view along a center axis 224 of manifold outlet 214. It will be appreciated that the top perspective view of assembly 200 may be oriented approximately 180° from the bottom perspective view.

As introduced above, exhaust manifold assembly 200 may include an integrated heat recovery system 202 that envelopes various passages of the exhaust manifold. In other words, heat recovery system 202 may contact various exterior surfaces of the manifold exhaust passages to recover heat generated from combustion via conduction. For example, the heat recovery system may contact various exterior surfaces associated with manifold outlet 214, converging portion 212, and/or exhaust runners 210.

Referring to FIGS. 3A-3B, heat recovery system 202 includes coolant inlet 226, main coolant passage 228, and coolant outlet 230. Coolant inlet 226 may be configured to receive circulating coolant from an engine coolant system (not shown). For example, a pump may be positioned upstream from coolant inlet 226 to pump coolant through heat recovery system.

Main coolant passage 228 may be in fluidic communication with coolant inlet 226 and coolant outlet 230. Thus, main coolant passage 228 may serve as a conduit for coolant to flow through heat recovery system 202. As shown, main coolant passage 228 may contact various surfaces of exhaust manifold 204 to recover exhaust heat via conduction. As described in more detail below, the main coolant passage may enable a flow path that travels in various directions that advantageously increases a rate of heat transfer.

Coolant outlet 230 may be configured to provide heated coolant to various downstream engine systems. For example, coolant may be distributed to a cabin heating system, a transmission system, a lubrication system, and/or another engine system. It will be appreciated, that coolant circulating through heat recovery system 202 may have a temperature at coolant outlet 230 that is warmer than a temperature of the circulating coolant at coolant inlet 226, for example.

Coolant may flow through heat recovery system 202 in a direction generally indicated by arrows 232. Collectively, arrows 232 may indicate a flow path of the coolant. Further, the coolant flow may be at least partially diverted due to the position of one or more casting depressions 218. For example, the casting depressions 218 may form a depression in at least a portion of the main coolant passage which may alter a coolant flow direction. In this way, the casting depressions 218 may reduce a contact area between the main coolant passage and the exhaust manifold, than if the casting depressions were excluded from the assembly.

The inventors herein have recognized that a particular position of each casting depression may contribute to heat transfer balance such that radiator stress is reduced. For example, under high loads, a coolant temperature may exceed the amount of heat that can be rejected by the radiator. However, with the inclusion of the casting depressions, which reduce coolant flow area contact with the exhaust manifold, radiator stress can be reduced by balancing heat transfer via conduction. Further, by reducing the contact area a catalyst light off temperature can be reached more rapidly.

Coolant may flow through main coolant passage 228 by passing through an upstream portion 234, a midstream portion 236, and a downstream portion 238 of the main coolant passage 228. It will be appreciated that the upstream, midstream, and downstream portions indicate general areas of the main coolant passage. FIGS. 3A-3B show dashed lines 240 to indicate a general boundary of each portion. It is to be understood that dashed lines 240 are provided to illustrate a general concept, and thus, are not meant to be limiting. Therefore, it will be appreciated that the general boundary of each portion may vary to some degree without departing from the scope of this disclosure.

Upstream portion 234 may be adjacent to, and in fluidic communication with, coolant inlet 226. Further, upstream portion 234 may be positioned in close proximity to manifold outlet 214 to advantageously match cooler coolant with a warmest portion of exhaust manifold 204. For example, an exterior surface of upstream portion 234 may make direct surface contact with an exterior surface of manifold outlet 214. In this way, upstream portion 234 may enable a higher heat transfer rate via conduction as compared to other portions of main coolant passage 228. As such, the coolest coolant entering the main coolant passage is matched with the warmest portion of the exhaust manifold.

As shown, upstream portion 234 may be generally defined as a region between dashed line 240A and dashed line 240B. Further, upstream portion 234 wraps around manifold outlet 214 within this general region, as shown. Said in another way, upstream portion 234 winds around a perimeter of the exterior surface of manifold outlet 214. Therefore, upstream portion 234 may contact manifold outlet 214 on a front side 242 (as best viewed in FIG. 3A), a rear side 244 (as best viewed in FIG. 3B), and intermediate sides between front side 242 and rear side 244. In this way, the coolant flow through upstream portion 234 may substantially circumnavigate manifold outlet 214. Further, a space between upstream portion 234 and manifold outlet 214 may be substantially small, if not nonexistent, to enable conductive heat transfer between the midstream region and the bottom exterior surface.

As best shown in FIG. 3A, midstream portion 236 may be adjacent to, and in fluidic communication with, upstream portion 234. Therefore, midstream portion 236 may be downstream from upstream portion 234. Further, midstream portion 236 may include a first midstream region 246 and a second midstream region 248. First midstream region 246 may be upstream from second midstream region 248.

As best shown in FIG. 3A, first midstream region 246 may be generally defined as a region between dashed line 240B and dashed line 240C. As shown, midstream region 246 may be in close proximity to converging portion 212 of exhaust manifold 204. For example, midstream region 246 may climb a side exterior surface of the converging portion. Said in another way, midstream region 246 may ascend the side exterior surface of the converging portion. Further, midstream region 246 may be in direct surface contact with the converging portion. In this way, coolant flowing through midstream region 246 may increase in temperature due to midstream region 246 being in direct surface contact with converging portion 212 to extract heat from the exhaust gas flow. In other words, a space between midstream region 246 and converging portion 212 may be substantially small, if not nonexistent, to enable conductive heat transfer between the midstream region and the bottom exterior surface.

Further, the coolant flow through midstream region 246 may be substantially opposite in direction from an exhaust flow direction through the converging portion of the exhaust manifold. For example, a direction of the coolant flow through midstream region 246 may be approximately 180° from the direction of the exhaust gas flow. As such, the coolant flow counters the exhaust flow within a region where midstream region 246 and converging portion 212 coincide.

As best shown in FIG. 3B, second midstream region 248 may be generally defined as a region between dashed line 240C and dashed line 240D. As shown, midstream region 248 may be in close proximity to bottom surface 222 of the plurality of manifold runners 210. For example, an exterior surface of midstream region 248 may be in direct surface contact with bottom exterior surfaces 222 of each of the plurality of manifold runners 210. In this way, coolant flowing through midstream region 248 may increase in temperature due to midstream region 248 being in direct surface contact with the manifold runners to extract heat from the exhaust gas flow. In other words, a space between midstream region 248 and bottom exterior surface 222 may be substantially small, if not nonexistent, to enable conductive heat transfer between the midstream region and the bottom exterior surface.

As shown, midstream region 248 generally follows a contour of the plurality of manifold runners. Therefore, midstream region 248 may have a surface geometry that closely matches a surface geometry of the plurality of manifold runners. For example, midstream region 248 may have a positive curvature that closely matches a positive curvature of a corresponding region of the manifold runners 210. For example, corresponding region 250 shows an example of matching surface geometries indicative of positive curvature. Said in another way, corresponding region 250 may show an example of matching surface geometries that are concave. Such a geometry may be associated with one manifold runner, for example.

As another example, midstream region 248 may have a negative curvature that closely matches a negative curvature of a corresponding region of the manifold runners 210. For example, corresponding region 252 shows an example of matching surface geometries indicative of negative curvature. Said in another way, corresponding region 252 may show an example of matching surface geometries that are convex. Such a geometry may be associated with a region between two manifold runners, for example.

Further, the coolant flow through midstream region 248 may be substantially orthogonal in direction from an exhaust flow direction through the plurality of manifold runners. For example, a direction of the coolant flow through midstream region 248 may be approximately 90° from the direction of the exhaust gas flow in each of the manifold runners.

As best shown in FIG. 3A, downstream portion 238 may be adjacent to, and in fluidic communication with, midstream portion 236. Therefore, downstream portion 238 may be downstream from midstream portion 236. Further, downstream portion 238 may include a first downstream region 254 and a second downstream region 256. First downstream region 254 may be upstream from second downstream region 256. Further, second downstream region 256 may be upstream from coolant outlet 230.

As shown, both first downstream region 254 and second downstream region 256 may be in close proximity to top surface 220 of the plurality of manifold runners 210. For example, top surface 220 may be substantially opposite from bottom surface 222. As such, top surface 220 may be oriented approximately 180° from bottom surface 222.

Further, downstream region 254 may be adjacent to downstream region 256, as shown. Further still, downstream region 254 may be spaced apart from downstream region 256 by gaps 258. It will be appreciated that downstream region 254 and downstream region 256 may be similar in shape. However, downstream region 254 may enable a coolant flow that is opposite in direction from the coolant flow through downstream region 256.

First downstream region 254 may be generally defined as a region between dashed line 240D and dashed line 240E. As introduced above, downstream region 254 may be in close proximity to top surface 220 of the plurality of manifold runners 210. Downstream region 254 may be in direct surface contact with top surface 220 similar to midstream region 248 in direct surface contact with bottom surface 222. As such, an exterior surface of downstream region 254 may be in direct surface contact with top exterior surface 220 of each of the plurality of manifold runners 210. In this way, coolant flowing through downstream region 254 may increase in temperature due to downstream region 254 being in direct surface contact with the manifold runners to extract heat from the exhaust gas flow. In other words, a space between downstream region 254 and top exterior surface 220 may be substantially small, if not nonexistent, to enable conductive heat transfer between the downstream region and the top exterior surface.

As shown, downstream region 254 generally follows a contour of the plurality of manifold runners and/or a contour of the converging portion. Therefore, downstream region 254 may have a surface geometry that closely matches a surface geometry of the plurality of manifold runners and/or a contour of the converging portion, similar in some respects to midstream region 248 and/or midstream region 246. Therefore, downstream region 254 may include a surface geometry that is indicative of a positive curvature and/or a negative curvature that closely matches a respective curvature of a corresponding region of the manifold runners 210 and/or converging portion 212. Said in another way, downstream region 254 may include a surface geometry that is concave and/or convex, similar to midstream regions 248 and 246.

Further, the coolant flow through downstream region 254 may be substantially orthogonal in some portions, and further, may be substantially parallel in other portions from an exhaust flow direction through the plurality of manifold runners. For example, a direction of the coolant flow through downstream region 254 may be approximately 90° from the direction of the exhaust gas flow in each of the manifold runners. Further, in other regions, the coolant flow through downstream region 254 may be substantially parallel and flow in a similar direction as compared to an exhaust flow direction through converging portion 212, for example.

Second downstream region 256 may be generally defined as a region between dashed line 240E and dashed line 240F. As introduced above, downstream region 256 may be in close proximity to top surface 220 of the plurality of manifold runners 210. Similar to downstream region 254, downstream region 256 may be in direct surface contact with top surface 220. As such, an exterior surface of downstream region 256 may be in direct surface contact with top exterior surface 220 of each of the plurality of manifold runners 210. In this way, coolant flowing through downstream region 256 may increase in temperature due to downstream region 256 being in direct surface contact with the manifold runners to extract heat from the exhaust gas flow. In other words, a space between downstream region 256 and top exterior surface 220 may be substantially small, if not nonexistent, to enable conductive heat transfer between the downstream region and the top exterior surface.

As shown, downstream region 256 generally follows a contour of the plurality of manifold runners. Therefore, downstream region 256 may have a surface geometry that closely matches a surface geometry of the plurality of manifold runners, similarly to midstream region 248. Therefore, downstream region 256 may include a surface geometry that is indicative of a positive curvature and/or a negative curvature that closely matches a respective curvature of a corresponding region of the manifold runners 210. Said in another way, downstream region 256 may include a surface geometry that is concave and/or convex, similar to midstream region 248.

Further, the coolant flow through downstream region 256 may be substantially orthogonal in direction from an exhaust flow direction through the plurality of manifold runners, similar to midstream region 248. For example, a direction of the coolant flow through downstream region 256 may be approximately 90° from the direction of the exhaust gas flow in each of the manifold runners.

Further, the coolant flow though downstream region 256 may be substantially parallel to the coolant flow through midstream region 248. Further still, the coolant flow through downstream region 256 and midstream region 248 may flow in the same general direction. For example, coolant flow through downstream region 256 and midstream region 248 may flow in a direction generally away from coolant inlet 226 and generally towards coolant outlet 230.

Further, the coolant flow through downstream region 256 may be opposite to the coolant flow through downstream region 254. As shown, downstream region 256 may transition to downstream region 254 by making an approximately 180° turn with a vicinity of dashed line 240E, for example.

Further, downstream regions 254 and 256 may include one or more return passages 260. As shown, the return passages may have a smaller cross sectional area than the downstream regions. The one or more return passages may channel coolant flow from downstream region 256 to downstream region 254. Said in another way, the one or more return passages may be in fluidic communication with both downstream region 256 and downstream region 254 to enable coolant flow to pass between the two downstream regions in a direction generally indicated by arrows 262. In this way, the one or more return passages 260 may enable some coolant to cycle through downstream portion 238. By including the one or more return passages, a flow area of the downstream portion can be minimized as compared to a hypothetical downstream portion that may exceed the flow area of the illustrated downstream portion (e.g., should region 254 coalesce with region 256 thereby eliminating gaps 258). Further, the one or more return passages 260 may reduce manifold slip during manufacturing.

Further, it will be appreciated that main coolant passage 228 may include one or more transition regions in fluidic communication with one or more of the aforementioned upstream, midstream, and downstream portions. For example, a region immediately upstream and downstream of each of the dashed lines 240 may represent a transition region. As such, the geometries of the transition regions may enable a coolant flow direction change between one or more of the upstream, midstream and downstream portions, for example.

It will be appreciated that the exhaust manifold assembly including exhaust manifold 204 and heat recovery system 202 are provided by way of example, and thus, are not meant to be limiting. Therefore, it will be appreciated that the illustrative embodiments may include additional and/or alternative features than those shown in FIGS. 2A-2B and 3A-3B. Further, it will be appreciated that the illustrative embodiments may differ to some degree without departing from the scope of this disclosure.

Figure 4:
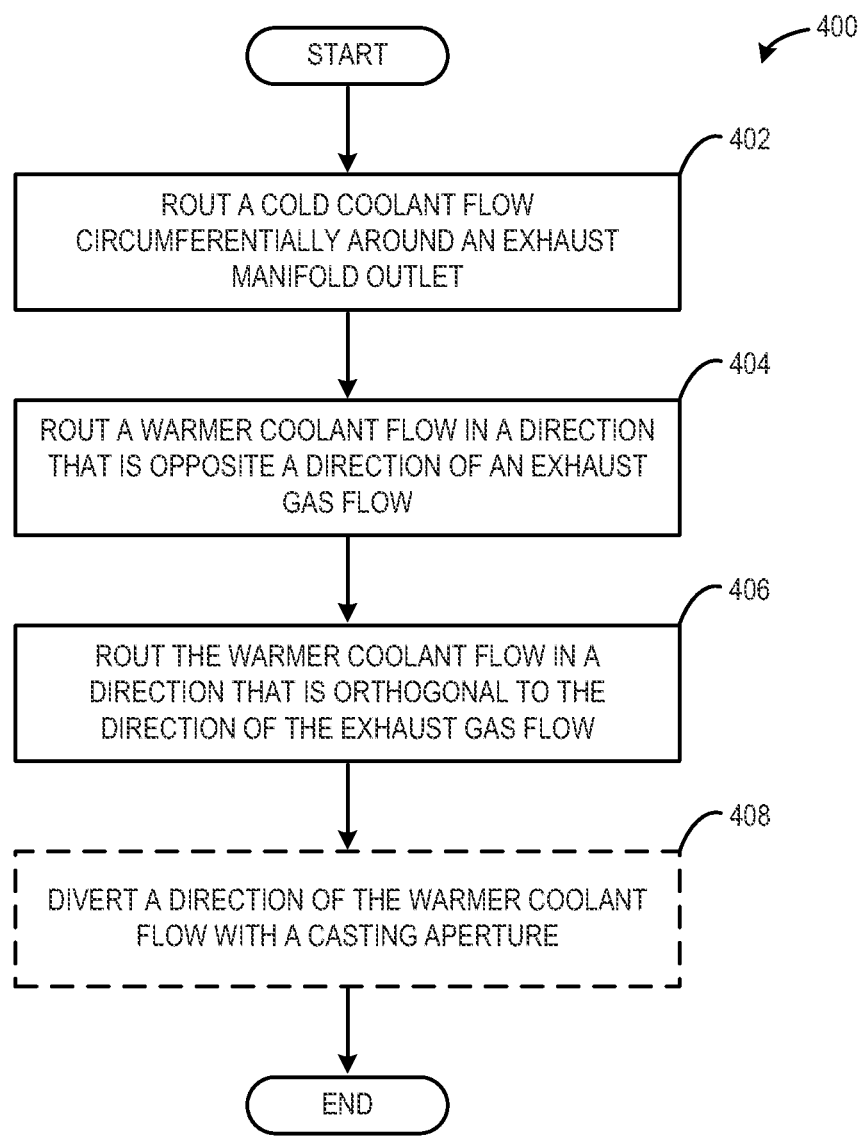
FIG. 4 shows an example method for routing a coolant flow through the exhaust manifold assembly of FIG. 2A according to an embodiment of the present disclosure.

FIG. 4 shows an example method 400 for recovering heat using an exhaust manifold assembly including an exhaust manifold and a heat recovery system. For example, method 400 may describe a method for routing coolant flow and contacting different exterior surfaces of the exhaust manifold.

At 402, method 400 includes routing cold coolant circumferentially around an exhaust manifold outlet. For example, upstream portion 234 may wrap around manifold outlet 214, as described above.

At 404, method 400 includes routing warmer coolant flow in a direction that is opposite a direction of an exhaust gas flow. For example, midstream portion 236 may ascend converging portion 212, as described above.

At 406, method 400 includes routing warmer coolant flow in a direction that is orthogonal to a direction of the exhaust gas flow. For example, downstream portion 238 may contact the plurality of runners 210, as described above.

At 408, method 400 may optionally include diverting a direction of the warmer coolant flow with a casting depression. For example, upstream portion 234, midstream portion 236, and/or downstream portion 238 may include one or more casting depressions 218 to reduce a contact area between the various coolant passages and the exhaust manifold to divert coolant flow, as described above.

It will be appreciated that 'cold' and 'warm' (and likewise 'colder' and 'warmer') as described herein refers to a relative coolant temperature of an upstream region as compared to a downstream region. For example, the cold coolant flow routed circumferentially around the exhaust manifold outlet may be colder relative to the warmer coolant flow associated with the midstream portion and/or the downstream portion.

It will be appreciated that method 400 is provided by way of example, and thus, is not meant to be limiting. Therefore, it is to be understood that method 400 may include additional and/or alternative steps than those illustrated in FIG. 4 without departing from the scope of this disclosure. Further, it is to be understood that method 400 may be performed in a suitable order and is not limited to the order illustrated in FIG. 4. Further still, one or more steps may be omitted from method 400 without departing from the scope of this disclosure.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. As another example as illustrated above, the exhaust manifold may include a plurality of manifold inlet passages (e.g., an inlet of manifold runners 210) converging to a single outlet (e.g., manifold outlet 214), and an engine coolant passage with a coolant inlet adjacent to the manifold outlet, where the coolant passage first wraps circumferentially around the manifold outlet passage (starting the wrap behind the manifold outlet toward an engine block side and then wrapping around the manifold outlet passage), and then traverses across at least some (and all in one example) of the plurality of inlet passages in a first direction on an underside along a bottom region of the manifold, and then wraps around one of the inlet passage to traverse to a top portion of the manifold before again traversing across at least some (and all in one example) of the plurality of manifold inlet passages on top of the plurality of manifold inlet passages in a second direction substantially opposite the first, and then reverses direction while still positioned on top of the plurality of runners to yet again traverse across at least some (and all in one example) of the plurality of manifold inlet passages on top of the plurality of manifold inlet passages in a third direction substantially opposite the second. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine comprising:
   an exhaust manifold including a plurality of runners and an outlet; and
   a heat recovery system including a coolant passage in direct surface contact with an exterior surface of the exhaust manifold and comprising an upstream portion that circumferentially winds around the outlet and is adjacent to an inlet of the coolant passage, and a downstream portion in direct surface contact with a top exterior surface of the runners.

2. The system of claim 1, wherein the downstream portion includes a first region and a second region, the first and second regions having an anti-parallel coolant flow.

3. The system of claim 2, wherein the first and second regions are in fluidic communication with one or more return passages, wherein the one or more return passages have a smaller cross sectional area than the first and second regions.

4. The system of claim 3, wherein the first or second region includes a positive curvature that matches a positive curvature of an exterior surface of a coinciding region of the plurality of runners.

5. The system of claim 3, wherein the first or second region includes a negative curvature that matches a negative curvature of an exterior surface of a coinciding region of the plurality of runners.

6. The system of claim 3, wherein the one or more return passages enable coolant to cycle through the downstream portion, and where the exhaust manifold is coupled to a cylinder head of the engine via a removable connection.

7. The system of claim 1, wherein the coolant inlet is in fluidic communication with the upstream portion, wherein the heat recovery system further comprises a coolant outlet in fluidic communication with the downstream portion, and wherein coolant flow through the upstream portion circumnavigates the outlet.

8. The system of claim 1, wherein the heat recovery system is in fluidic communication with an engine coolant system and forms at least a portion of the coolant system.

9. The system of claim 1, further including a plurality of circular casting depressions that divert a coolant flow direction through the heat recovery system.

10. The system of claim 9, wherein the plurality of casting depressions reduce manifold slip during manufacturing.

11. The system of claim 1, wherein the coolant passage further includes a midstream portion downstream of the upstream portion, the midstream portion including a first region upstream of a second region, an exterior surface of the first region in direct surface contact with an exterior surface of a converging portion of the exhaust manifold, and an exterior surface of the second region in direct surface contact with bottom exterior surfaces of the runners.

12. A manifold assembly including:
    an exhaust manifold including a plurality of runners converging to a single outlet; and
    a coolant passage including an upstream portion positioned such that coolant flow therein winds around a perimeter of an exterior surface of the outlet, and a downstream portion positioned such that coolant flow therein is orthogonal to an exhaust flow through the runners.

13. The assembly of claim 12, wherein the exhaust manifold further includes a converging portion positioned between the plurality of runners and the outlet, wherein the coolant passage further includes a midstream portion arranged downstream of the upstream portion, the midstream portion ascending the converging portion and including a first region upstream of a second region, wherein a direction of coolant flow in the first region is opposite from a direction of exhaust flow through the converging portion, and wherein a direction of coolant flow in the second region is orthogonal to a direction of exhaust flow through the runners.

14. The assembly of claim 12, wherein the downstream portion includes a first region and a second region, wherein the first region includes coolant flow in a direction that is opposite to a direction of coolant flow through the second region, and wherein a direction of coolant flow through the first and second regions is orthogonal to a direction of exhaust flow through the runners.

15. The assembly of claim 14, wherein the first region and the second region contact a top exterior surface of the runners and are spaced apart by a gap, the downstream portion further including a transition region in fluidic communication with the first and second regions, the transition region positioned downstream from the first region and upstream from the second region.

16. An engine method, comprising:
    routing cold coolant flow circumferentially around a perimeter of an exterior surface of an exhaust manifold outlet, the cold coolant flow circumnavigating the outlet, and the exhaust manifold removably coupled to a cylinder head;
    routing warmer coolant flow in a direction that is opposite a direction of an exhaust gas flow; and
    routing warmer coolant flow in a direction that is orthogonal to a direction of the exhaust gas flow.

17. The method of claim 16, further comprising diverting a direction of the warmer coolant flow with a casting depression.

18. The method of claim 16, wherein the cold coolant flow routed circumferentially around the perimeter of the exterior surface of the exhaust manifold outlet is colder relative to the warmer coolant flow, wherein the cold coolant flow is upstream from the warmer coolant flow.

19. The system of claim 1, wherein downstream of the upstream portion, a midstream portion of the coolant passage traverses across a bottom exterior surface of at least some of the runners in a first direction, and wherein downstream of the midstream portion, the downstream portion traverses across a top exterior surface of at least some of the runners in a second direction substantially opposite to the first direction before again traversing across the top exterior surface of at least some of the runners in a third direction substantially opposite to the second direction.

20. The assembly of claim 12, wherein downstream of the upstream portion, a midstream portion of the coolant passage traverses across a bottom exterior surface of at least some of the runners in a first direction, and wherein downstream of the midstream portion, the downstream portion traverses across a top exterior surface of at least some of the runners in a second direction substantially opposite to the first direction before again traversing across the top exterior surface of at least some of the runners in a third direction substantially opposite to the second direction.

\* \* \* \* \*